(12) United States Patent
Rasmussen

(10) Patent No.: US 12,449,118 B2
(45) Date of Patent: Oct. 21, 2025

(54) SYSTEMS FOR MULTI-LENS DEVICES

(71) Applicant: Harman Professional Denmark ApS, Aarhus N (DK)

(72) Inventor: Niels Joergen Rasmussen, Egaa (DK)

(73) Assignee: HARMAN PROFESSIONAL DENMARK APS, Aarhus N (DK)

( * ) Notice: Subject to any disclaimer, the term of this patent is extended or adjusted under 35 U.S.C. 154(b) by 0 days.

(21) Appl. No.: 18/963,416

(22) Filed: Nov. 27, 2024

(65) Prior Publication Data
US 2025/0172284 A1    May 29, 2025

Related U.S. Application Data

(60) Provisional application No. 63/603,569, filed on Nov. 28, 2023.

(51) Int. Cl.
| | | |
|---|---|---|
| F21V 31/00 | (2006.01) | |
| G02B 7/02 | (2021.01) | |
| G02B 27/00 | (2006.01) | |

(52) U.S. Cl.
CPC ............ F21V 31/005 (2013.01); G02B 7/021 (2013.01); G02B 27/0006 (2013.01)

(58) Field of Classification Search
CPC .... G02B 27/0006; G02B 7/008; G02B 7/021; G02B 7/026; G02B 7/028; F21V 31/00; F21V 31/005; F21V 31/03; F21V 31/04; F21V 5/008
See application file for complete search history.

(56) References Cited

U.S. PATENT DOCUMENTS

| | | | | |
|---|---|---|---|---|
| 1,325,936 | A * | 12/1919 | Fouasse | A61B 1/00096 |
| | | | | 219/121.6 |
| 8,649,103 | B2 * | 2/2014 | Andreasch | G02B 26/0875 |
| | | | | 359/666 |
| 2004/0150891 | A1 * | 8/2004 | Ichino | G02B 7/021 |
| | | | | 359/704 |
| 2007/0146906 | A1 * | 6/2007 | Kugler | G03F 7/70891 |
| | | | | 359/819 |
| 2008/0062695 | A1 | 3/2008 | Peterson et al. | |
| 2008/0170303 | A1 | 7/2008 | Bieg et al. | |
| 2013/0271641 | A1 * | 10/2013 | Calvet | G02B 7/028 |
| | | | | 348/340 |

FOREIGN PATENT DOCUMENTS

| | | | | |
|---|---|---|---|---|
| CN | 212480961 | U | | 2/2021 |
| CN | 116413879 | A * | 7/2023 | ............ G02B 7/028 |
| CN | 219389660 | U | | 7/2023 |
| EP | 2350522 | B1 | | 7/2014 |
| EP | 2861494 | B1 | | 12/2017 |
| JP | 4235427 | B2 | | 3/2009 |
| JP | 6437573 | B2 | | 12/2018 |
| WO | 2023006608 | A1 | | 2/2023 |

OTHER PUBLICATIONS

European Patent Office, Partial European Search Report Issued in Application No. 24215098.5, Apr. 30, 2025, Germany, 14 pages.

* cited by examiner

Primary Examiner — Alexander K Garlen
(74) Attorney, Agent, or Firm — McCoy Russell LLP

(57) ABSTRACT

Systems are provided a multi-lens device. In one example, the multi-lens device includes a volumetrically flexible compartment fluidly coupled to a gap between a first lens and a second lens of a lens assembly. The gap and the flexible compartment are hermetically sealed from outside of the lens assembly. A desiccant is positioned between the compartment and the gap.

18 Claims, 9 Drawing Sheets

SYSTEMS FOR MULTI-LENS DEVICES

CROSS REFERENCE TO RELATED APPLICATIONS

The present application claims priority to U.S. Provisional Application No. 63/603,569 entitled SYSTEMS FOR MULTI-LENS DEVICES filed Nov. 28, 2023. The entire content of the above application is hereby incorporated by reference for all purposes.

FIELD

The disclosure relates to multi-lens devices, and more specifically, optical devices.

BACKGROUND/SUMMARY

Multi-lens devices may include, but are not limited to, windows, cameras, lights, telescopes, and binoculars. Multi-lens devices may include a lens assembly having multiple lenses (e.g., two or more lenses) spaced apart from one another. The lens assembly may be hermetically sealed. For example, a compartment encompassing a gap between adjacent lenses may be hermetically sealed with a gas therein. In one example, an inert gas may be hermetically sealed between lenses to increase optical clarity of the lens, for instance by reducing condensation.

Such compartments of the lens assembly may be prone to pressure fluctuations due to variation in ambient temperature. These pressure fluctuations may result in additional stress experienced by gaskets and/or sealants. Over time, the additional stress may degrade the gaskets and/or sealants, allowing the inert gas to escape and/or for impurities to enter. Thus, there may be a demand for systems different than those presently available.

SUMMARY

The disclosure provides support for multi-lens device, comprising a volumetrically flexible compartment fluidly coupled to a gap between a first lens and a second lens of a lens assembly, wherein the gap and the flexible compartment are hermetically sealed from outside of the lens assembly.

In this way, changes in temperatures may result in a corresponding increase or decrease in volume of the flexible compartment, thereby reducing an effect on pressure within the gap compared to systems where the hermetically sealed volume is fixed. Thus, gaskets and/or seals that form the hermetic seal of the gap from the outside of the lens assembly may experience less stress and therefore may maintain the hermetic seal more effectively and/or for a longer period of time. Further, the multi-lens device may include a desiccant positioned between the gap and the flexible compartment. The desiccant may reduce moisture in the gap, decreasing condensation formation within the gap on the lenses.

It should be understood that the summary above is provided to introduce, in simplified form, a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The disclosure may be better understood from reading the following description of non-limiting embodiments, with reference to the attached drawings, wherein below:

FIGS. 5A-5F are shown approximately to scale.

DETAILED DESCRIPTION

Figure 2:
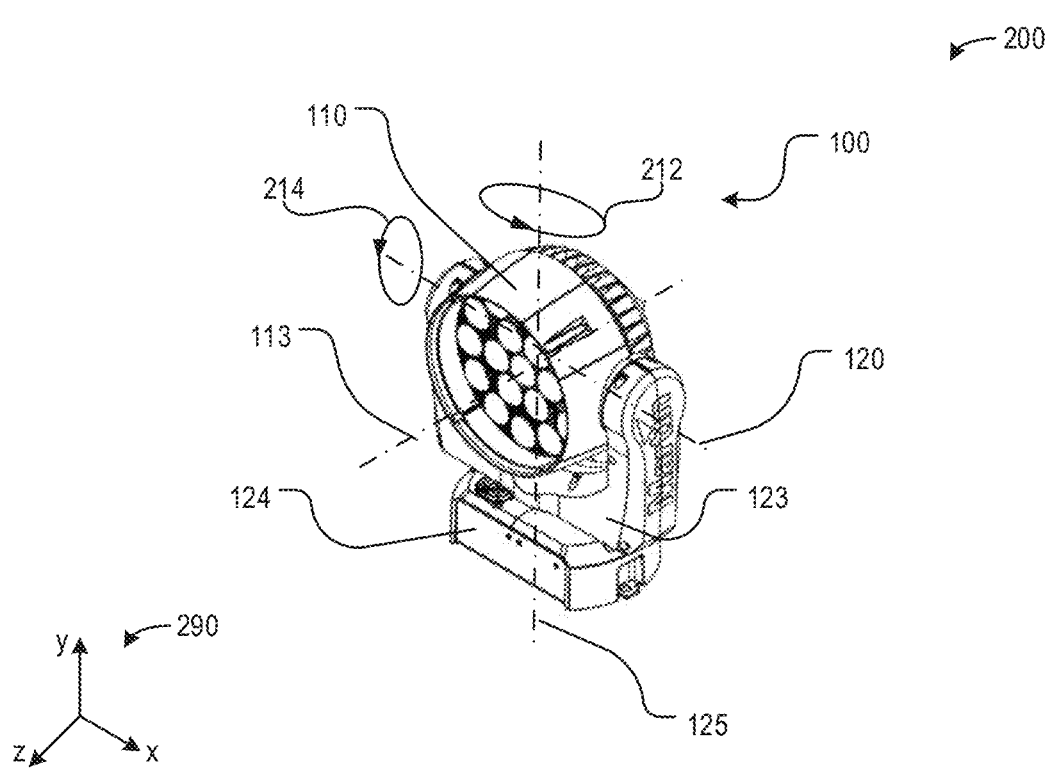
FIG. 2 illustrates a perspective view of the multi-lens device.
Figure 3:
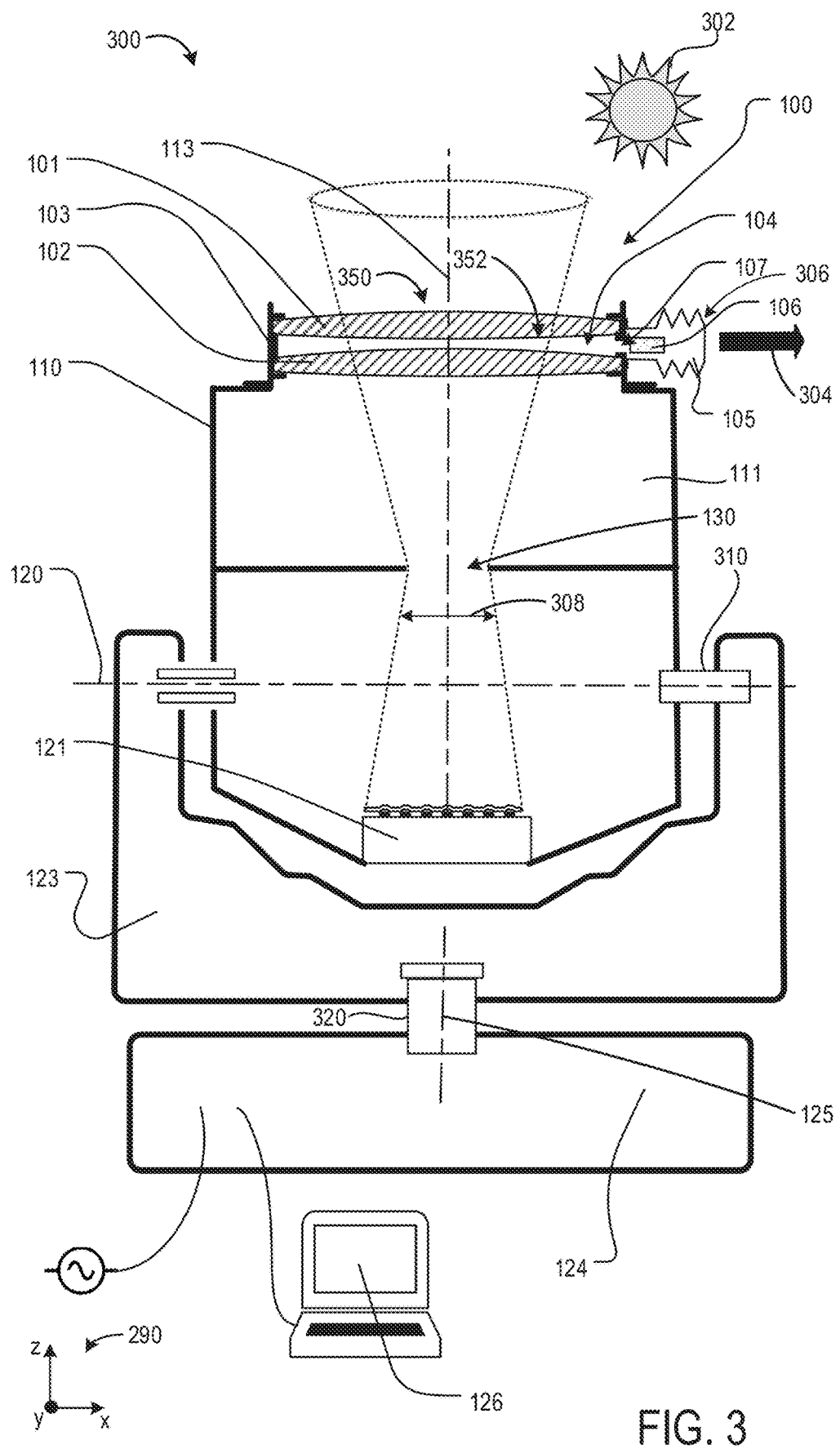
FIG. 3 illustrates the multi-lens device exposed to a first temperature.
Figure 4:
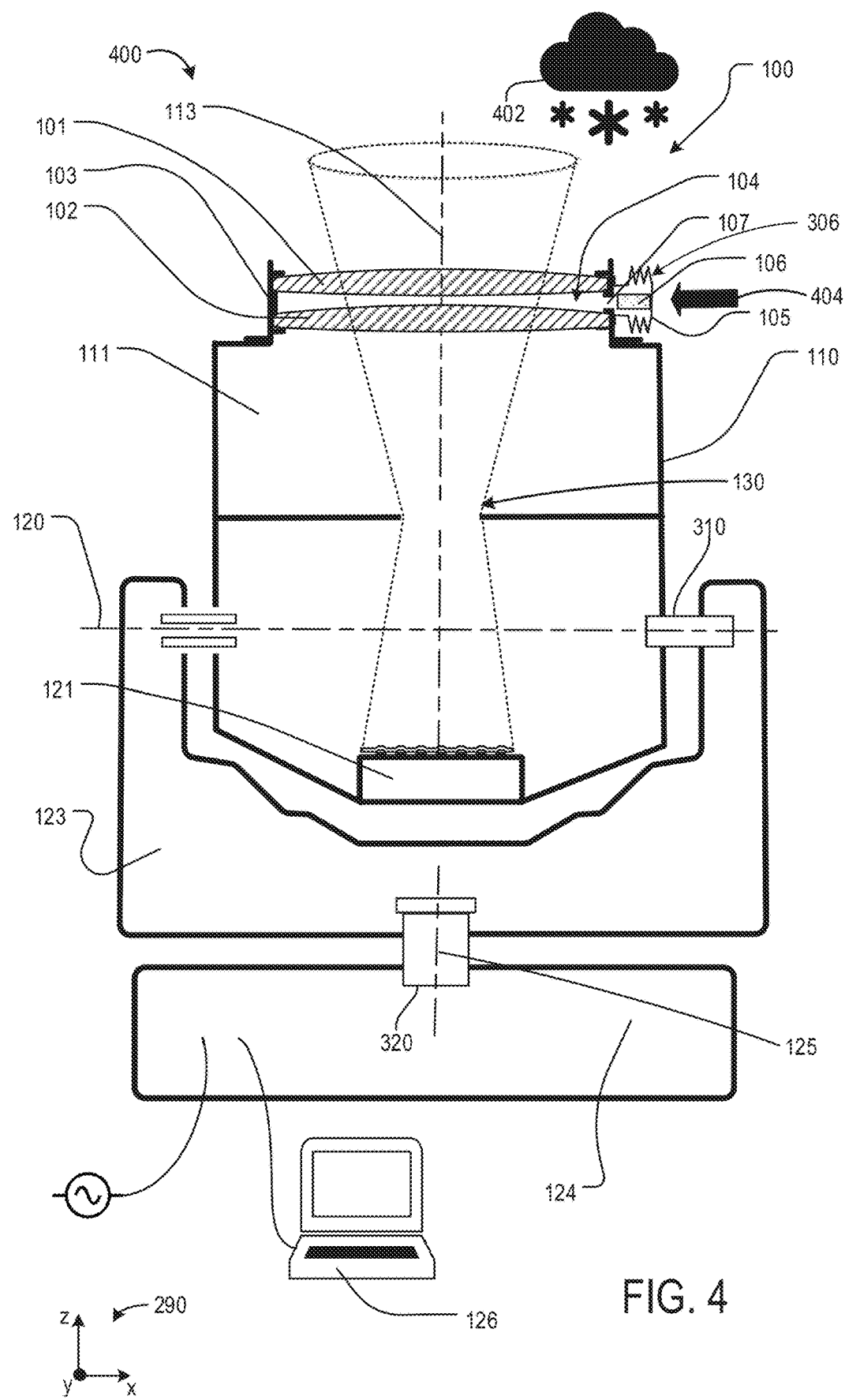
FIG. 4 illustrates the multi-lens device exposed to a second temperature.

The present disclosure provides support for a multi-lens device. In one example, the multi-lens device is an optical device. In another example, additionally or alternatively, the multi-lens device is a light fixture. The multi-lens device may be used in a variety of indoor and/or outdoor settings, an example of which is shown schematically in FIG. 1. A perspective view of an example of the multi-lens device is shown in FIG. 2. FIGS. 3 and 4 illustrate schematics of the multi-lens device in different temperature settings. FIGS. 5A-5F illustrate different views of an exemplary multi-lens device including a lens assembly thereof having an expansion device.

It is to be understood that the specific assemblies and systems illustrated in the attached drawings, and described in the following specification are exemplary embodiments of the inventive concepts defined herein. For purposes of discussion, the drawings are described collectively. Thus, like elements may be commonly referred to herein with like reference numerals and may not be re-introduced.

Figure 1:
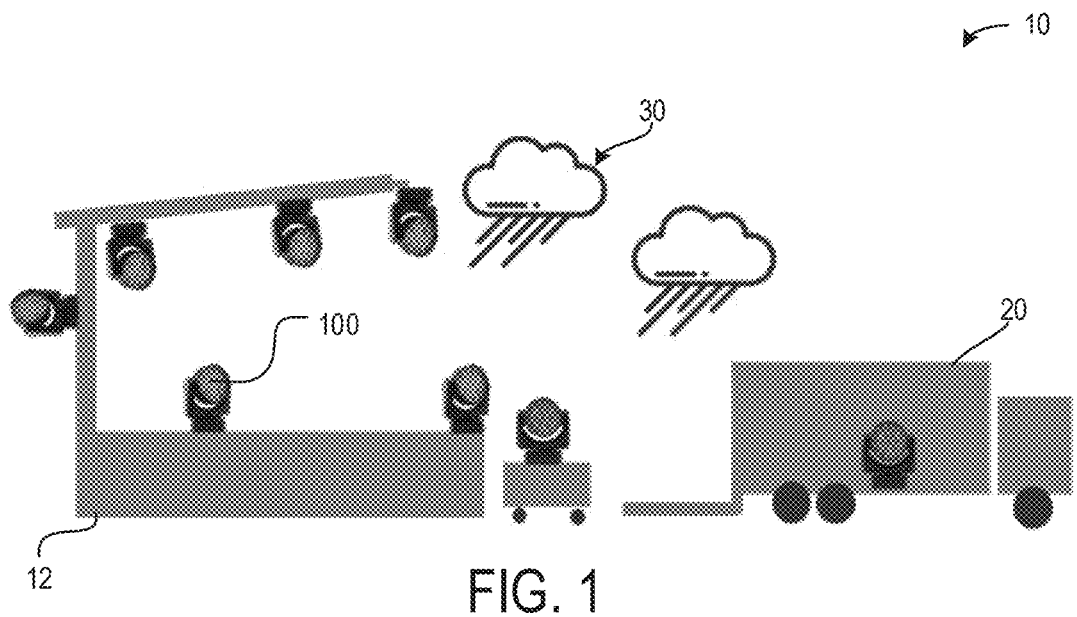
FIG. 1 illustrates an environment for a multi-lens device.

Turning now to FIG. 1, it shows an environment 10. In one example, the environment 10 is an outdoor setting comprising a stage 12. In other examples, the stage 12 may be indoors. The stage 12 may be an amphitheater. A transportation device 20 may transport various equipment for positioning on the stage.

A plurality of multi-lens devices, including a multi-lens device 100, may be positioned on or coupled to portions of the stage 12. The multi-lens device 100 may be exposed to different weather and temperature conditions, such as rain 30, a temperature of the transportation device 20, and outside (e.g., ambient) temperatures. As discussed herein, temperature changes greater than a determined value may stress one or more seals and/or gaskets of the multi-lens device 100.

For example, varying temperature may affect pressure experienced by the seals and/or gaskets according to the ideal gas law provided in equation (1):

$$PV = nRT \qquad (1)$$

wherein n and R are constants and at constant volume (V), pressure (P) will increase when temperature (T) increases. Equation (1) may be a simplified representation of general correlations between pressure, temperature, and volume of a sealed compartment of the multi-lens device 100. The gas within the sealed compartment may depart from the ideal gas law, behaving more precisely according to other equations of state. However, the correlations between pressure, temperature, and volume (e.g., directly related vs inversely related) may be captured by equation (1) and are used herein to demonstrate the effects of ambient condition changes on sealed compartments.

Stresses experienced by the seal and/or gasket at higher or lower pressures may prematurely degrade the seal and/or gasket, which may allow water, dust, and other contaminants to enter previously hermetically sealed compartments. Additionally, degradation to the seal and/or gasket may allow leakage of the gas out of the previously hermetically sealed compartments. As such, a expansion device may be included with the multi-lens device 100, where the expansion device is configured to account for pressure changes due to temperature fluctuations, delaying degradation of the seal and/or gasket and thus prolonging a hermetic seal of the hermetically sealed compartments.

Turning now to FIG. 2, it shows a perspective view 200 of the multi-lens device 100. As such, components previously introduced are similarly numbered in this and subsequent figures. An axis system 290 comprising an x-axis, a y-axis, and a z-axis is shown in FIGS. 2-5F for comparison of the orientations illustrated therein. In one example, the x-axis is parallel to a lateral direction, the y-axis is parallel to a vertical direction, and the z-axis is parallel to a transverse direction.

The multi-lens device 100 may include a base 124 coupled to a yoke 123. The base 124 may be fixed to a structure, such as the stage 12 of FIG. 1 or framework extending therefrom. As such, the base 124 may be stationary.

The yoke 123 may be positioned vertically above the base 124. The yoke 123 may be coupled to the base 124 in such a way that the yoke 123 may rotate relative to the base 124. For example, the yoke 123 may be configured to articulate relative to the base 124 about a pan axis 125, parallel to the y-axis. In one example, the yoke 123 may articulate in a direction identical to arrow 212 about the pan axis 125. In another example, the yoke 123 may articulate in a direction opposite of the arrow 212 about the pan axis 125.

The yoke 123 may further be coupled to a housing 110 of the multi-lens device 100. For example, the yoke 123 may extend up sides of the multi-lens device 100 and couple to the multi-lens device 100 at diametrically opposite points from one another. In this way, the housing 110 may be configured to articulate relative to the yoke 123 about a tilt axis 120, parallel to the x-axis. For example, the housing 110 may articulate in a rotational direction identical or opposite to arrow 214 about the tilt axis 120. The tilt axis 120 may be normal to the pan axis 125.

An optical path 113 may be adjusted based on the articulation of one or more of the yoke 123 and the housing 110. For example, the optical path 113 may be parallel with light emitted from the multi-lens device 100. Articulation of the yoke 123 may adjust the horizontal location (e.g., x- and z-directional components) of the optical path 113. Articulation of the housing 110 may adjust the vertical elevation (e.g., y-directional component) of the optical path 113. In other examples, the optical path 113 may be fixed, rather than moveable.

Turning now to FIGS. 3 and 4, they show examples 300 and 400, respectively, of the multi-lens device 100 exposed to a first temperature 302 and a second temperature 402. In one example, the first temperature 302 is greater than the second temperature 402. FIGS. 3 and 4 further illustrate an interior of the multi-lens device 100. FIGS. 3 and 4 are described in tandem herein.

The multi-lens device 100 may include a first articulating joint 310 arranged between the housing 110 and the yoke 123. The first articulating joint 310 may allow the housing 110 to rotate about the tilt axis 120 relative to the yoke 123. The multi-lens device 100 may further include a second articulating joint 320 arranged between the yoke 123 and the base 124. The second articulating joint 320 may allow the yoke 123 to rotate about the pan axis 125 relative to the base 124.

A controller 126 may be electrically coupled to the multi-lens device 100. The controller 126 may include instructions stored in memory (e.g., non-volatile memory) that cause the controller 126 to adjust a position of the multi-lens device 100 along the pan axis 125 or along the tilt axis 120. The instructions may further cause the controller to adjust an output of a light source 121.

The multi-lens device 100 may comprise an interior volume 111 shaped via the housing 110. The interior volume 111 may include the light source 121 configured to emit light toward a lens assembly 350. For example, the light source 121 may be a light emitting diode (LED) configured to emit one or more colors (e.g., wavelengths) of light.

The lens assembly 350 may include one or more of the first lens 101, the second lens 102, and a lens assembly housing 103. The lens assembly 350 may include two or more lenses, additionally or alternatively to the first lens 101 and the second lens 102. In one example, the lens assembly housing 103 may be physically coupled to the housing 110. In some examples, additionally or alternatively, the lens assembly housing 103 and the housing 110 may be a single piece. The lens assembly 350 may further include a gap 104. The gap 104 may be an enclosed space between the first lens 101 and the second lens 102. In this way, the first lens 101 is spaced away from and does not touch the second lens 102.

The lenses 101, 102 may be constructed of a transparent material, such as glass or plastic. The lenses 101, 102 may include surface features, such as bends (e.g., convex or concave surfaces), divots, grooves, protrusions, textures, a combination thereof, and/or the like. For example, the surface features may be configured to focus or otherwise redistribute light passing through the lenses 101, 102. Additionally or alternatively, the lenses 101, 102 may be flat (e.g., planar) on one or more surfaces thereof, such as a window pane. Additionally or alternatively, the lenses 101, 102 may have smooth surfaces. The first lens 101 and the second lens 102 may be identical. In other examples, the first lens 101 and the second lens 102 may have different shapes (e.g., convexity, perimeter shape, etc.) and/or sizes (e.g., diameter, perimeter, surface area, thickness, etc.).

The first lens 101 and the second lens 102 may be positioned such that the lenses 101, 102 receive light emitted from the light source 121. The lenses 101, 102 may be positioned such that the second lens 102 is closer to the light source 121 than the first lens 101. The light may travel through the first lens 101 prior to reaching the second lens 102. The first lens 101 and the second lens 102 may be positioned parallel to one another. The optical path 113 may extend through both the first lens 101 and the second lens 102.

In some examples, there may be further lenses included in the multi-lens device 100, such as three or more lenses, through which the optical path 113 extends such that the lenses receive the light emitted by the light source 121. Two or more lenses may be arranged in parallel with gaps similar to the gap 104 interposed between each pair of adjacent lenses. The gaps may be fluidly coupled to each other and hermetically sealed from outside of the multi-lens device 100.

The optical path 113 may further extend through components interposed between the light source 121 and the lenses 101, 102. For example, the optical path 113 may extend through an opening 130 which may adjust a beam width 308 of the light emitted by the light source 121. There may be additional components not shown in FIGS. 3 and 4 that are interposed between the light source 121 and the lenses 101, 102.

The gap 104 may contain an inert gas. For example, the gap 104 may be filled with an inert gas, comprising a single inert gas or a combination of inert gasses. The gases included in the gap 104 may include one or more of oxygen, nitrogen, argon, neon, or other inert gas. In one example, the gap 104 is argon flush such that substantially only argon is present in the gap 104. The gap 104 may be sealed from the exterior of the multi-lens device 100. For example, one or more seals and/or gaskets may be configured to form a hermetic seal from the atmosphere. In this way, impurities may be blocked from entering the gap 104. For example, liquid droplets or vapor (e.g., water, alcohol, oil, etc.) may not be allowed within the gap 104. By hermetically sealing the gap 104, condensation forming on one or both of the lenses 101, 102 may be reduced (e.g., prevented), increasing quality of optics of the multi-lens device 100.

Throughout temperature fluctuations, a pressure within the gap 104 may change accordingly. For example, changes in ambient temperature (e.g., due to weather patterns) and/or internal temperature (e.g., the light source 121 heating the gas within the gap 104) may cause such pressure variations, for instance according to the equation (1) provided above or a different corresponding equation of state.

The lens assembly 350 may further include an expansion device 306 coupled to the lens assembly housing 103. The expansion device 306 may include a flexible compartment 105 and a desiccant 106. An interior volume of the flexible compartment 105 may be fluidly coupled to the gap 104 via an opening 107 within the lens assembly housing 103. The flexible compartment 105 may be sealed from atmosphere such that the gap 104 and interior volume 111 of the housing 110 are hermetically sealed from the atmosphere. A sealed space 352 may include the interior of the flexible compartment 105 and the gap 104. The sealed space 352 may be sealed from an outside of the lens assembly 350. The sealed space 352 may have an adjustable volume, due to inclusion of the flexible compartment 105. In this way, temperature and/or pressure change of gasses in the sealed space 352 may result in a corresponding volume change of the sealed space 352.

The desiccant 106 may be positioned within or adjacent to the opening 107. The desiccant 106 may be configured to reduce moisture within the gap 104. For example, the desiccant 106 may include desiccating pellets which draw water molecules from the gap 104 into the flexible compartment 105 while allowing air flow both ways across the desiccant 106. Additionally or alternatively, the desiccant 106 may include a permeable membrane which allows for air or inert gas flow from the gap 104 to the flexible compartment 105 and vice versa, and lets water molecules pass from the gap 104 to the flexible compartment 105 but not from the flexible compartment 105 to the gap 104. In this way, water molecules may be drawn out of the gap 104 via the desiccant 106, reducing condensation accumulation on the lenses 101, 102. Additionally, the desiccant 106 may not impede transfer of gasses between the gap 104 and the flexible compartment 105 according to temperatures and pressures.

The flexible compartment 105 may be configured to expand or contract based on a temperature of gases within the gap 104. That is, the flexible compartment 105 may have an adjustable volume contained therein. Thus, the flexible compartment 105 may also be referred to herein as a volumetrically flexible compartment 105. The flexible compartment 105 may be constructed of a flexible material, such as a rubber, silicone, ethylene-propylene diene monomer (EPDM), a combination thereof, or the like. For example, the flexible material may form an inflatable balloon. Additionally or alternatively, the flexible compartment 105 may be structured (e.g., shaped) so as to be collapsible and expandable, with or without stretching the material. For example, the flexible compartment 105 may be configured as a bellows with accordion-like folds (e.g., zig zag folds, fan folds, etc.), or other flexible structure that may be concertinaed. As another example, the flexible compartment 105 may be configured as a moveable piston that shifts to increase or decrease volume fluidly coupled with the gap 104 according to the pressure within the gap 104. In this way, the flexible compartment 105 may allow for adjustment of volume (e.g., rather than pressure) of the gap 104 as a consequence of temperature changes. For example, the flexible compartment 105 may be configured to volumetrically expand to at least a quarter of the volume of the gap 104. Additionally or alternatively, the flexible compartment 105 may increase the volume of the sealed space 352 in the expanded position by 1.1 or more times compared to the contracted position.

In the example 300 of FIG. 3, the first temperature 302 is a relatively high temperature, which may increase a pressure of gases within the gap 104. The flexible compartment 105 is illustrated in an expanded position, thereby increasing a volume of the sealed space 352, and reducing a pressure of the gases therein. For examples where the flexible compartment 105 is constructed of a flexible material, the flexible material may be under elastic tension in the expanded position. The elastic tension may cause the flexible compartment to expand further from the gap 104, such as in a direction indicated by arrow 304. For examples where the flexible compartment 105 includes folds (e.g., a bellows), the folds may be stretched to include wider angles therebetween and/or extend further from the gap 104 (e.g., in the direction indicated by the arrow 304) in the expanded position. For examples where the flexible compartment includes a moveable piston, the moveable piston may be positioned further away from the gap 104 (e.g., in the direction indicated by the arrow 304) in the expanded position.

In the example 400 of FIG. 4, the second temperature 402 is a relatively low temperature, which may decrease a pressure of gases within the gap 104. The flexible compartment 105 is illustrated in a contracted position, thereby decreasing the volume of the sealed space 352, and increasing a pressure of the gases therein. The flexible compartment 105 may be compressed towards the gap 104 in the contracted position, for example in a direction indicated by arrow 404. For examples where the flexible compartment 105 is constructed of a flexible material, the elastic tension may be released, allowing for retraction and bending of the flexible compartment 105. For examples where the flexible compartment includes folds, the folds may be compacted to include narrower angles therebetween and/or move closer to the gap 104 (e.g., towards the direction indicated by the arrow 404). For examples where the flexible compartment 105 includes a moveable piston, the moveable piston may be located closer to the gap 104 in the contracted position compared to the expanded position.

By allowing the flexible compartment 105 to expand and contract to minimize pressure changes within the gap 104, the hermetic seal of the gap 104 and the flexible compartment 105 from the exterior of the lens assembly 350 (e.g., atmosphere) may be maintained such that condensate and other contaminants may not enter the gap 104 and degrade a condition of the first lens 101 or the second lens 102.

In the examples of FIGS. 3 and 4, the flexible compartment 105 is shown expanding and contracting in directions parallel with the lenses 101, 102 and perpendicular to the optical path 113. In other examples, the flexible compartment 105 may be oriented to expand and contract in other directions. For example, the flexible compartment may extend perpendicular with the lenses 101, 102 and/or parallel with the optical path 113. Such a configuration may allow the expansion device 306 to be positioned within the housing 110, as shown in the example of FIGS. 5A-5F, reducing a packing volume of the multi-lens device 100. However, in other examples, the expansion device 306 may be configured in other orientations, for instance where the flexible compartment extends neither parallel nor perpendicular to the lenses 101, 103 or the optical path 113. In this way, the expansion device 306 may be configured relative to the gap 104 and the lenses 101, 102 according to a configuration of the multi-lens device 100, which may vary between embodiments thereof such as an optical device (e.g., light fixture, binoculars, etc.), automotive device, thermal window, electronic device, etc.

Turning now to FIGS. 5A-5E, they show various views of parts of the multi-lens device 100 and the lens assembly 350 comprising an expansion device 510.

Figure 5A:
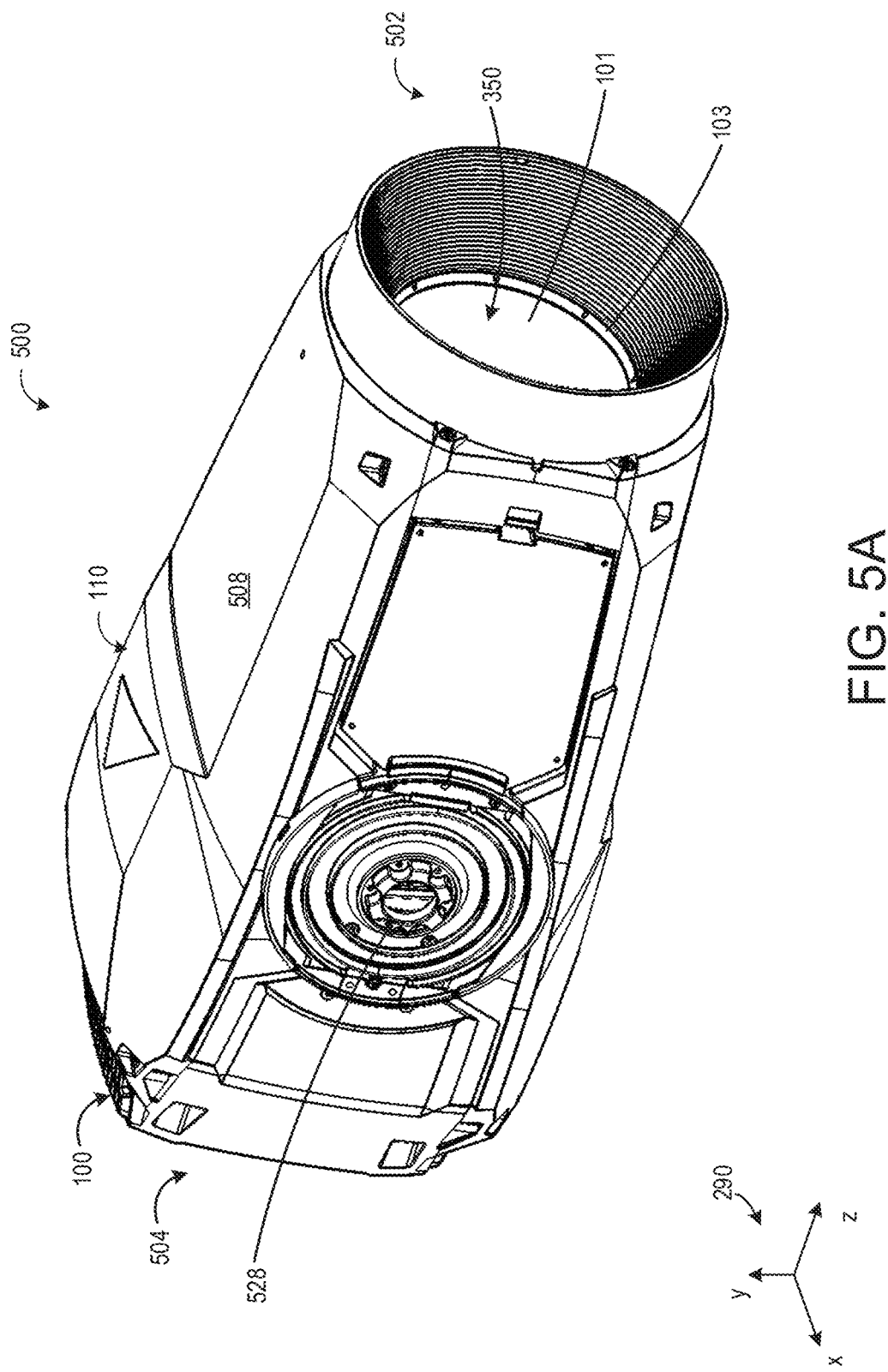
FIGS. 5A-5F illustrate different views of the multi-lens device including an expansion device.

FIG. 5A shows a fully assembled view 500 of the housing 110 of the multi-lens device 100. Therein, the interior volume of the housing 110 is sealed and a removable top cover 508 is fastened in place. The lens assembly housing 103 may be coupled to the housing 110. Alternatively, the lens assembly housing 103 may be integral with the housing 110. For example, the lens assembly housing 103 may be at a first end 502 of the multi-lens device 100. The housing 110 may include various features for actuating the multi-lens device 100, such as a receptacle 528 for the first articulating joint 310 of FIGS. 3 and 4.

Figure 5B:
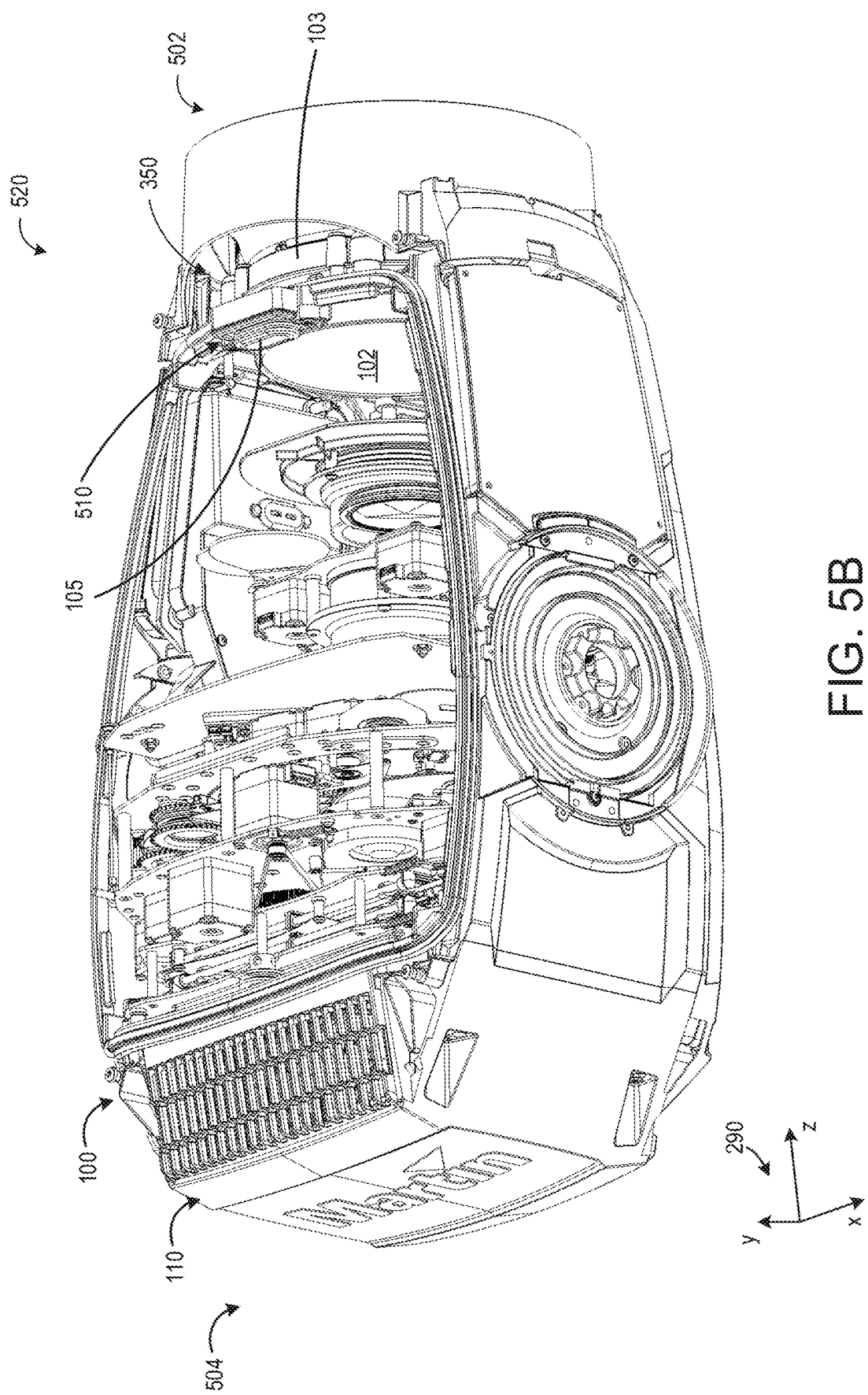

FIG. 5B shows an interior view 520 of the housing 110 of the multi-lens device 100. Therein, the top cover 508 is removed and components of the multi-lens device 100 are shown, including the second lens 102 and the expansion device 510. A light source such as the light source 121 of FIGS. 3 and 4 may be positioned near a second end 504 of the multi-lens device 100 within an interior thereof, for instances where the multi-lens device 100 is an optical device such as a light fixture. The expansion device 510 is an example of the expansion device 306 of FIGS. 3 and 4. As such, the expansion device 510 comprises the flexible compartment 105.

Figure 5C:
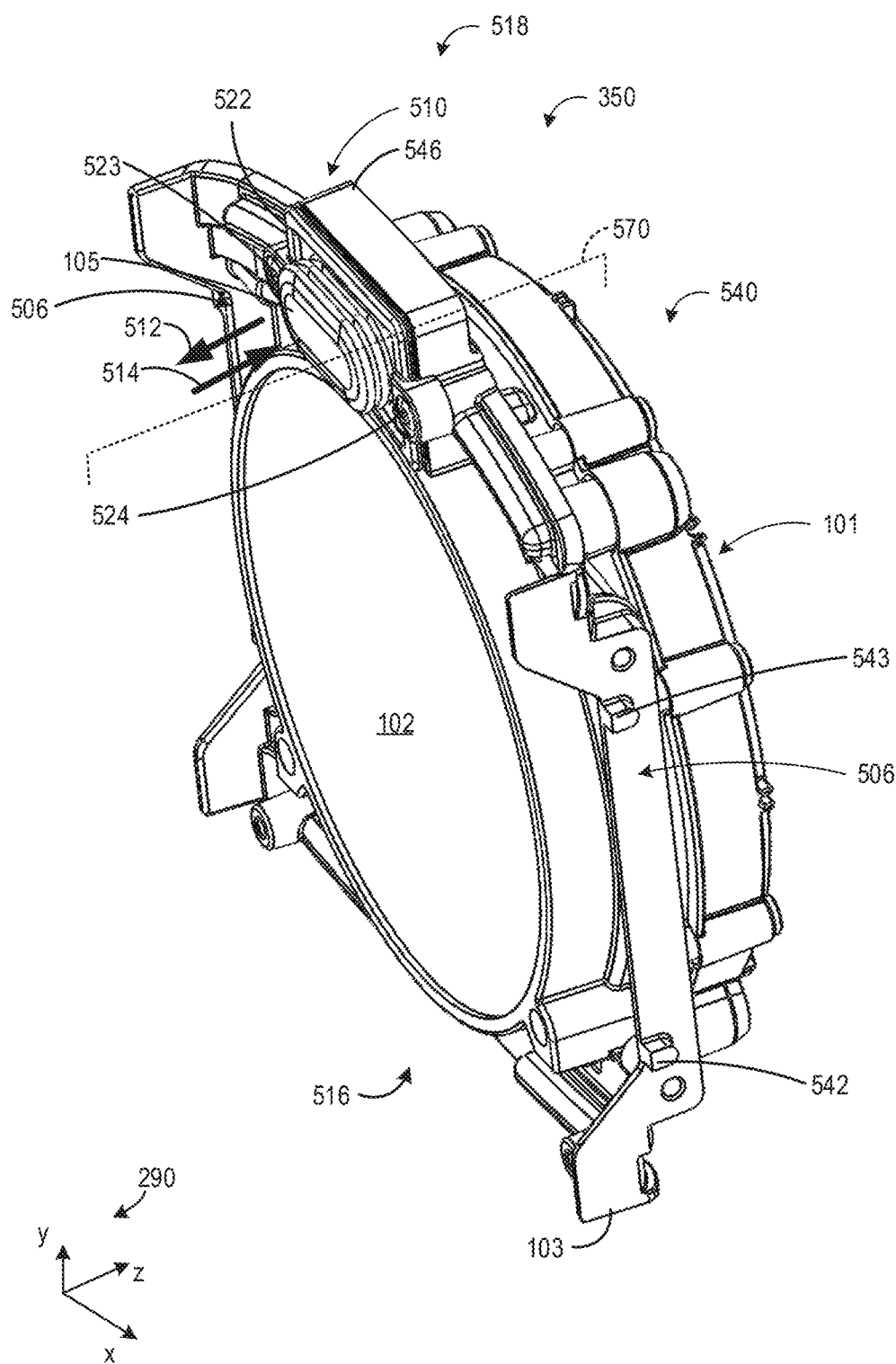

FIG. 5C shows an example 540 of the lens assembly housing 103. The lens assembly housing 103 may include a plurality of features that may engage with features of the housing 110 of the multi-lens device 100 to physically couple the lens assembly housing 103 to the housing 110. In one example, the lens assembly housing 103 is fixedly coupled to the housing 110 via tabs 542, 543 engaging with slots of the housing 110.

In one example, the lens assembly housing 103 may include a rectangular shape having a bottom portion 516, side arms 506, and a top portion 518. In other examples, the lens assembly housing 103 may include other shapes, such as circular, without departing from the scope of the present disclosure. The lens assembly housing 103 may circumferentially surround the lenses 101, 102 and the gap 104. The tabs 542, 543 may be arranged on the side arms 506. The lens assembly housing 103 may be sealably coupled to the lenses 101, 102, such that a hermetic seal is formed between an interior of the expansion device 510 (which is fluidly coupled to the gap 104) and an outside of the expansion device 510. For example, gaskets may be positioned at interfaces where the lenses 101, 102 meet the lens assembly housing 103, such as along circumferences of the lenses 101, 102.

The top portion 518 of the lens assembly housing 103 may include a mount 546 extending therefrom. The expansion device 510 may be housed at least partially within the mount 546. The mount 546 may extend from a portion of the lens assembly housing 103 that surrounds the second lens 102, as shown in the example in FIG. 5C. Additionally or alternatively, the mount 546 may extend from a portion of the lens assembly housing 103 that surrounds the gap 104. Additionally or alternatively, the mount 546 may extend from a portion of the lens assembly housing 103 that surrounds the first lens 101. The mount 546 may extend radially away from the lenses 101, 102.

Alternatively, the mount 546 may extend transversely away from the lenses 101, 102. As described above, the orientation of the expansion device 510 may be selected according to a configuration of the multi-lens device 100. As such, the mount 546 extend in a direction from the lenses 101, 102 according to the desired direction of expansion of the flexible compartment 105. For example, the mount 546 may protrude from the lens assembly housing 103 in a direction perpendicular to an expansion direction 512 and a contraction direction 514 whereby the flexible compartment 105 may expand and contract, respectively. The mount 546 may support the flexible compartment 105 throughout actuation (e.g., expansion and contraction) thereof.

The flexible compartment 105 may be fluidly coupled with the mount 546. Further, the flexible compartment 105 may be sealed with the mount 546 around a perimeter of the flexible compartment 105 so as to maintain the hermetic seal between the inside of the expansion device 510 and the outside of the expansion device 510. The flexible compartment 105 may be positioned at least partially in the mount 546 and retained relative thereto via a cover 522. The cover 522 may be physically coupled to the mount 546 via fasteners 523, 524. For example, the cover 522 may be interposed between the flexible compartment 105 and the mount 546, as described further below with regard to FIG. 5D. The fasteners 523, 524 may include screws, bolts, or the like which extend through the cover 522 and the mount 546. Additionally or alternatively, the cover 522 may be physically coupled to the mount 546 via other means such as adhesive, welding, etc.

Figure 5D:
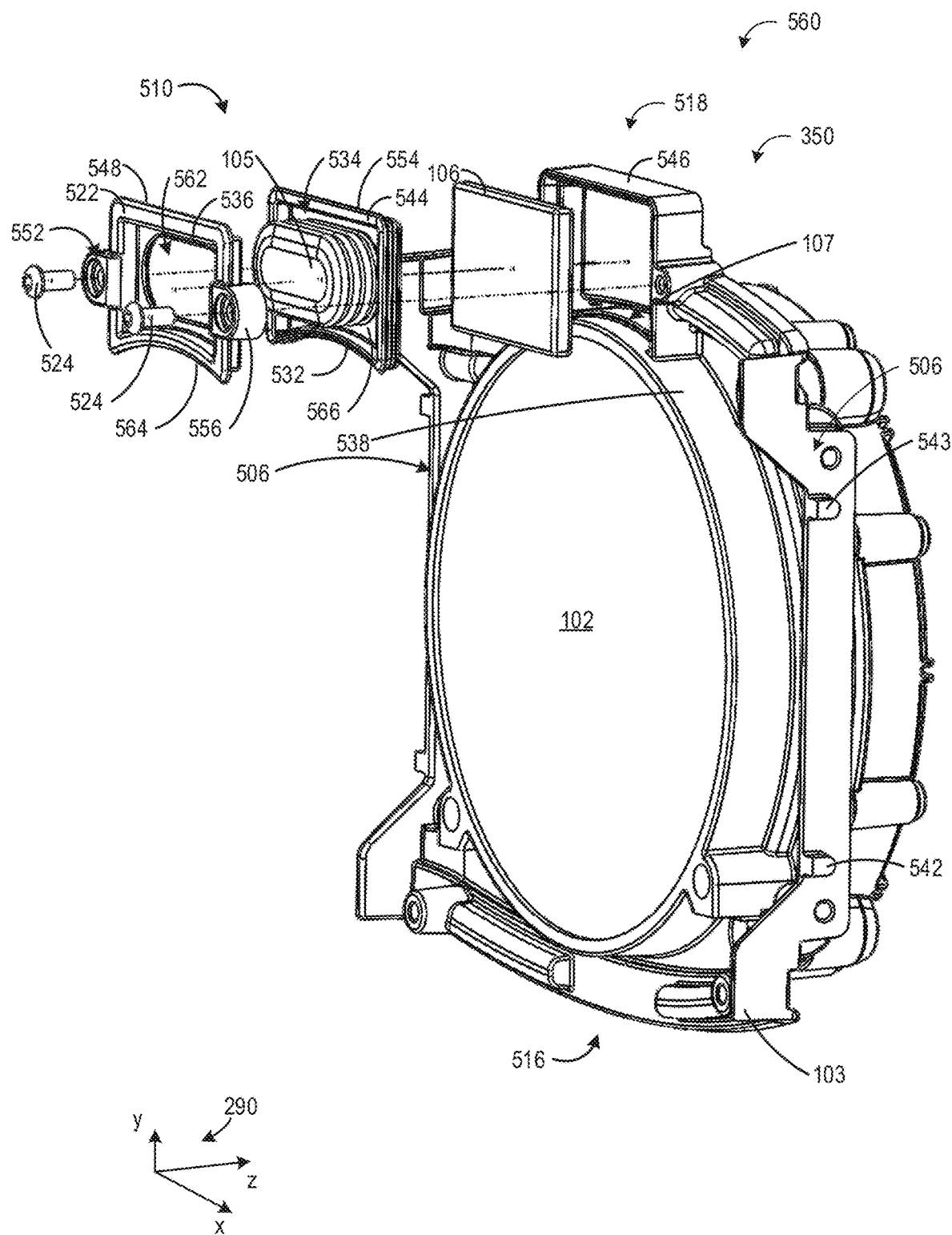

FIG. 5D shows an exploded view 560 of the expansion device 510. The lens assembly housing 103 comprises the at least one opening 107 that fluidly couples the flexible compartment 105 to the gap 104 between the first lens 101 and the second lens 102. In one example, the opening 107 may be used to flush the gap 104 with an inert gas, such as argon, krypton, or nitrogen, prior to installing and sealing the lens assembly housing 103 with the expansion device 510. In this way, the gap 104 may be filled with an inert gas, and may not contain other materials, such as water vapor.

The desiccant 106 may be inserted into an interior of the mount 546 prior to the flexible compartment 105. As described above, the desiccant 106 may comprise a permeable membrane that regulates water transfer thereacross in only one direction or a plurality of pellets that attract moisture. The desiccant 106 may be shaped according to the mount 546. For example, the desiccant 106 may fill the interior of the mount 546 such that an entire perimeter of the desiccant 106 is in contact with an inner surface of the mount 546. In this way, any molecules traveling through the mount 546 pass through the desiccant 106. Thus, the desiccant 106 may regulate material transport therethrough between the gap 104 (which is fluidly coupled to the mount 546 via the opening 107) and the flexible compartment 105. For example, as described above, water molecules may be allowed to pass through the desiccant 106 from the mount 546 to the flexible compartment, but not vice versa. In this way, condensation formation on the lenses 101, 102 may be reduced. Gasses intended to be within the gap 104 between the lenses 101, 102 (e.g., inert gasses flushed into the gap 104) may be allowed to travel both directions across the desiccant 106 between the gap 104 and the flexible compartment 105. In this way, as pressure increases in the gap 104, gasses may flow into the flexible compartment 105, expanding the volume of the flexible compartment 105 and minimizing a pressure change in the gap 104. For example, the flexible compartment 105 may expand outwards (e.g., away from the lens assembly housing 103 and/or parallel with the z-axis) Likewise, as pressure decreases in the gap 104, gasses may flow into the gap 104 from the flexible compartment 105, contracting the volume of the flexible compartment 105 and minimizing a pressure change in the gap 104. For example, the flexible compartment 105 may shrink inwards (e.g., towards the lens assembly housing 103 and/or parallel with the z-axis), in the contraction direction 514. By providing volumetric flexibility of the flexible compartment 105 and fluidly coupling the flexible compartment 105 to the gap 104, an interior volume comprising the flexible compartment 105 and the gap 104 may be volumetrically flexible, reducing impact of temperature changes on pressure therein.

The flexible compartment 105 may be interposed between the desiccant 106 and the cover 522. A gasket 544 surrounding the perimeter of the flexible compartment 105 may be in face-sharing contact with the desiccant 106 and the cover 522 when assembled such that the desiccant 106 encloses a space inside of the flexible compartment 105. The gasket 544 may be shaped according to the mount 546 and the ring-shaped portion 538 of the lens assembly housing 103. The gasket 544 may include a curvature along a bottom edge 532 that matches a curvature of the second lens 102. In this way, the flexible compartment 105 may be positioned such that the bottom edge 532 of the gasket 544 is flush with the second lens 102, or with a ring-shaped portion 538 of the lens assembly housing 103 that circumferentially surrounds the second lens 102. Alternatively, the lens assembly housing 103 may include a leveling portion that levels a curvature of the ring-shaped portion 538 where the mount 546 protrudes therefrom, allowing for the bottom edge 532 to be straight and flush with the lens assembly housing 103.

The cover 522 may be large enough to cover the gasket 544. The cover 522 may include a frame comprising an outer perimeter 548 approximately the same (e.g., identical) in size and shape to an outer perimeter 554 of the gasket 544. For example, a bottom edge 564 of the cover 522 may include curvature that matches the bottom edge 532 of the gasket 544. In this way, the cover 522 may also be flush with the ring-shaped portion 538 of the lens assembly housing 103. Additionally or alternatively, the bottom edges 532, 564 may include curvature that matches curvature of at least one of the first lens 101 and the second lens 102. In some examples, the desiccant 106 may also include a curved bottom edge with curvature that matches at least one of the first lens 101, the second lens 102, the ring-shaped portion 538, the bottom edge 532, and the bottom edge 564. The cover 522 may further include an inner perimeter 536 that extends into a space 534 between a lip of the gasket 544 and the flexible compartment 105. In at least some examples, the gasket 544 and the flexible compartment 105 are integral. The gasket 544 and the flexible compartment 105 may be connected via a connecting surface 566 having an inner perimeter along the flexible compartment 105 and an outer perimeter along the gasket 544. The connecting surface 566 may be integral with the flexible compartment 105 and the gasket 544. The inner perimeter 536 of the cover 522 may be approximately the same size and shape as the inner perimeter of the connecting surface 566. The inner perimeter 536 of the cover 522 may shape an opening 562 of the cover 522 through which the flexible compartment 105 may extend. The opening 562 may be shaped and sized according to the flexible compartment 105. For example, the cross section of the flexible compartment 105 perpendicular to the expansion direction 512 and contraction direction 514 may be approximately the same as the shape of the inner perimeter 536 and at least as large. By including the opening 562, the flexible compartment 105 may actuate (e.g., expand and contract respectively in the expansion direction 512 and the contraction direction 514) through the opening 562 based on only pressures of the gap 104 and atmosphere. For example, the cover 522 may not restrict expansion or contraction of the flexible compartment 105. The fasteners 523, 524 may extend through through-holes 552 in protrusions 556 of the cover 522 and thread with the mount 546 to fasten the expansion device 510 to the lens assembly 350. For example, the protrusions 556 may extend outward from opposing sides of the frame of the cover 522. The fasteners 523, 524 may not intersect the gasket 544 or the desiccant 106. There may be additional fasteners in some examples, where the fasteners are equidistantly distributed around the opening 562. In this way, the fasteners 523, 524 may compress the gasket 544 between the mount 546 and the cover 522, forming a hermetic seal around the outer perimeter 554 of the gasket 544.

Figure 5E:
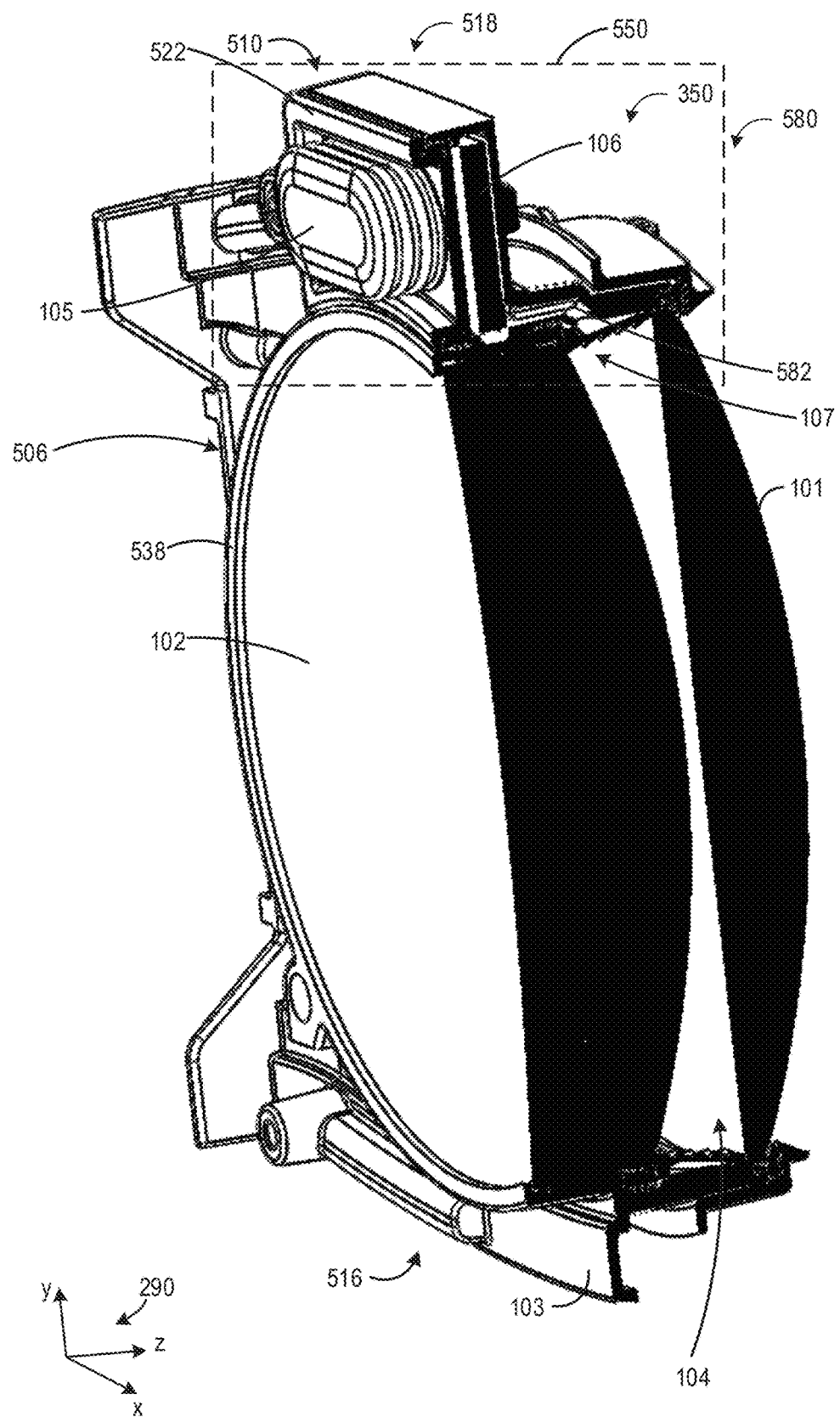

FIG. 5E shows a cross-sectional view 580 of the lens assembly 350, including the first lens 101, the second lens 102, the lens assembly housing 103, the gap 104, and the mount 546. The cross-sectional view 580 may be a cross section taken along a cutting plane 570 in FIG. 5C. The cross-sectional view 580 may illustrate a channel 582 that extends from the at least one opening 107 to the mount 546. Gases may flow between the gap 104 and the flexible compartment 105 via the opening 107 and the channel 582. Water vapor may travel via the opening 107 and the channel 582 to the desiccant 106 to reduce moisture within the gap 104.

Figure 5F:
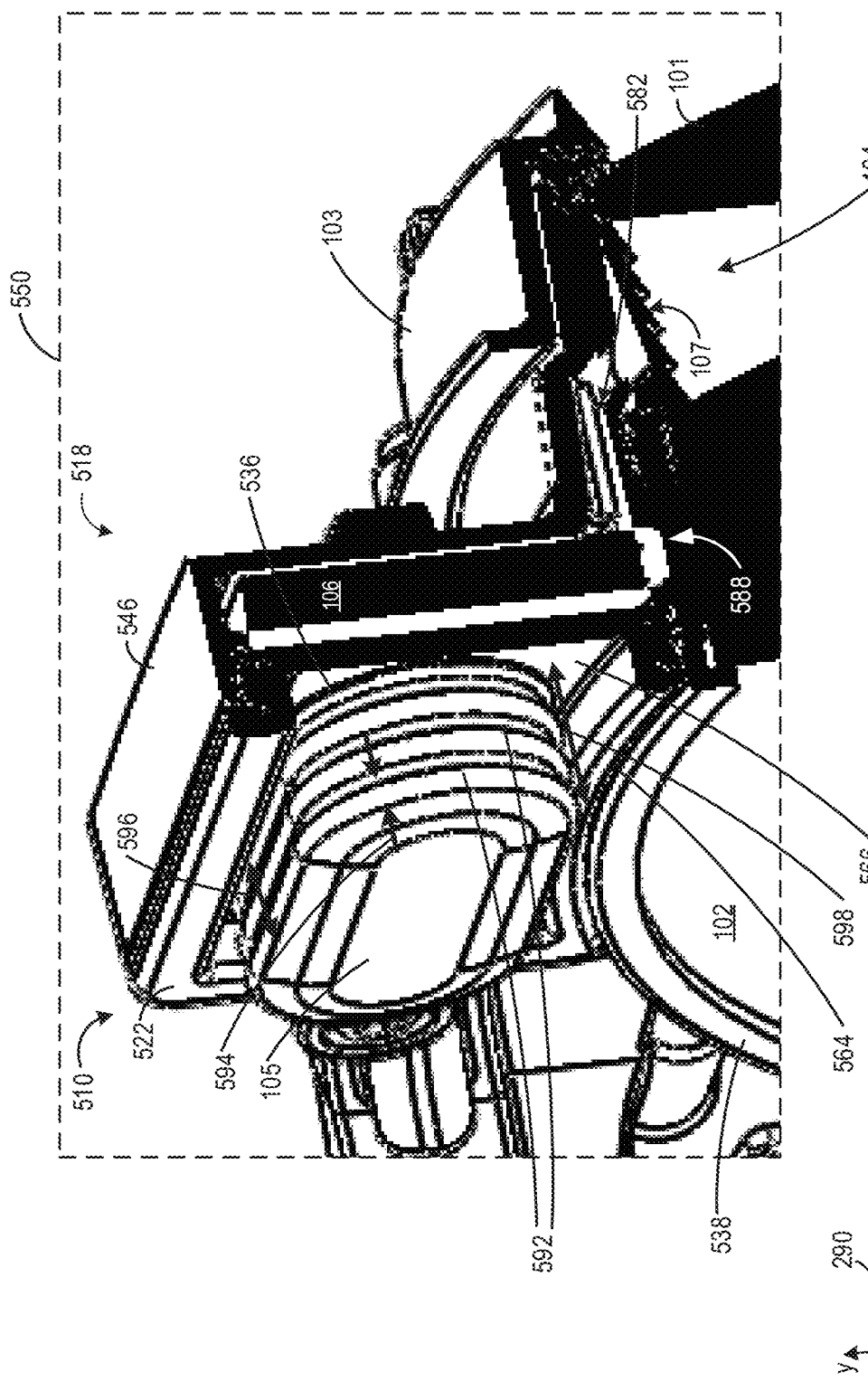

A portion 550 of FIG. 5E is shown enlarged for greater detail in FIG. 5F. For example, the position shown in FIGS. 5E and 5F may be a relatively contracted position where the flexible compartment 105 has a smaller volume than a more expanded position. The flexible compartment 105 may include a plurality of folds 592. The plurality of folds 592 may be zig-zag folds that allow for volumetric expansion and contraction of the flexible compartment 105 similar to a bellows, accordion, or the like. For example, a distance 594 between adjacent folds of the plurality of folds 592 may be greater in a relative expanded position of the flexible compartment 105 compared to a relatively contracted position thereof. Additionally or alternatively, a distance 596 by which the flexible compartment 105 protrudes from the cover 522 may be greater in a relatively expanded position compared to a relatively contracted position. Additionally or alternatively, a distance 598 by which the flexible compartment 105 protrudes from the connecting surface 566 may be greater in a relatively expanded position compared to a relatively contracted position.

The example of the flexible compartment 105 shown in FIGS. 5A-5F is non-limiting as to mechanisms of volumetric flexibility. For example, other volumetrically flexible compartment examples may not include folds. For example, additionally or alternatively, the volumetrically flexible compartment may include an inflatable balloon constructed of an elastic material with the expanded position being an inflated state and the contracted positioned being a deflated state. Alternatively, a moveable piston may shift between the expanded position where the piston is closest to the gap 104 and the contracted position where the piston is furthest from the gap 104. In this way, the flexible compartment 105 may be configured to increase and decrease the volume therein that is fluidly coupled to the gap 104. The configuration of the flexible compartment 105 may be selected according to an application of the expansion device 510. For example, the resistance to expansion and the range of volumes between the expanded position and the contracted position may be adjusted by modifying features of the flexible compartment 105, such as size (e.g., contracted and expanded sizes relative to one another and the gap 104), structure (e.g. more or fewer folds, if included), material (e.g., more or less elasticity), etc. Additionally, the flexible compartment 105 may be shaped according to an available space within the multi-lens device 100, such as the interior volume within the housing 110 of FIGS. 2-5B. For example, the flexible compartment 105 may have a greater cross-sectional area (e.g., in an x-y plane) in examples where the distance 596 is constrained by other components in the multi-lens device being proximate to the expansion device 510 along the z-axis such that the distance 596 may have a shorter range and provide the same volume changes as an example with smaller cross-sectional area. That is, the geometry of the flexible compartment 105 may be selected to adjust the distances by which the flexible compartment expands and contracts.

As the temperature changes within the gap 104, the flexible compartment 105, and/or an exterior of the lens assembly 350, gasses may be exchanged between the gap 104 and the flexible compartment 105 accordingly via the opening 107 and the channel 582. The adjustable volume of the flexible compartment 105 expands and contracts as the gasses are exchanged. The channel 582 may be a through-hole in the lens assembly housing 103 that extends from the opening 107 to inside of the mount 546. The channel 582 may extend radially outward from the opening 107 at an inner perimeter of the ring-shaped portion 538 towards an outer perimeter of the ring-shaped portion 538. Additionally, in examples where the mount 546 is not aligned directly radially with respect to the gap 104, the channel 582 may extend transversely. For example, the channel 582 may lead to the desiccant 106 which may be positioned within the mount 546. A portion of the channel 582 may be perpendicular to the desiccant 106. The desiccant 106 may be positioned within an indent 588 in the ring-shaped portion 538 such that the channel 582 intersects the desiccant 106 at or near a bottom of the desiccant 106. In this way, gas exchange may be forced through the desiccant 106, rather than circumventing the desiccant 106, when transferring between the flexible compartment 105 and the gap 104.

In some embodiments, there may be a second channel fluidly coupled to a second opening. In such an example, the second channel may be identical to the channel 582. Additionally or alternatively, the second opening may be identical to the opening 107. Having two sets of channels and openings may allow inert gas to be flushed into the gap 104. For example, with the channels oriented at a vertical top, the inert gas may be applied to a first channel of the two sets, and air may exit via a second channel of the two sets due to being lighter than the inert gas. Both of the two sets may fluidly couple the gap 104 with the flexible compartment 105.

The technical effect of the multi-lens device comprising the expansion device in accordance with the present disclosure is to prolong a lifetime of one or more hermetic seals which fluidly separate a gap between adjacent lenses from an exterior of the multi-lens device. For example, degradation to the gaskets and/or seals may be reduced by allowing for volumetric adjustment of an interior comprising a flexible compartment and the gap in response to temperature variation. In this way, a magnitude of pressure changes due to the temperature variation may be reduced, decreasing stress experienced by the gaskets and/or seals. Thus, the gaskets and/or seals may maintain the hermetic seal more effectively and/or for a longer period of time, compared to previous systems with volumetrically constant gaps between lenses. By maintaining the hermetic seal of the gap between lenses, impurities (e.g., water, dust, and/or any other substance than the inert gas within the gap) may be prevented from entering and degrading optical quality. Further, the desiccant positioned within the flexible compartment may draw moisture out of the gap and into the flexible compartment, reducing (e.g., preventing) condensation formation on the lenses.

The disclosure also provides support for a multi-lens device, comprising: a volumetrically flexible compartment fluidly coupled to a gap between a first lens and a second lens of a lens assembly, wherein the gap is hermetically sealed from outside of the lens assembly. In a first example of the system, the system further comprises: a desiccant arranged between the flexible compartment and the gap. In a second example of the system, optionally including the first example, the flexible compartment is housed in a mount of the lens assembly, the flexible compartment retained within the mount via a cover. In a third example of the system, optionally including one or both of the first and second examples, the flexible compartment is integral with a gasket interposed between the cover and the mount. In a fourth example of the system, optionally including one or more or each of the first through third examples, a gasket and the cover include curvature that matches curvature of at least one of the first lens and the second lens. In a fifth example of the system, optionally including one or more or each of the first through fourth examples, the gap is filled with an inert gas. In a sixth example of the system, optionally including one or more or each of the first through fifth examples, the flexible compartment is a bellows with a plurality of folds.

The disclosure also provides support for an optical device, comprising a light source, a lens assembly including two or more lenses that receive light emitted by the light source, a gap between two of the lenses, and a lens assembly housing circumferentially surrounding the lenses and the gap, and an expansion device including a flexible compartment arranged in a mount of the lens assembly housing and fluidly coupled to the gap, wherein the flexible compartment is retained within the mount via a cover. In a first example of the system, the cover comprises an opening through which the flexible compartment actuates. In a second example of the system, optionally including the first example, the system further comprises: a desiccant arranged in the mount, between the gap and the flexible compartment. In a third example of the system, optionally including one or both of the first and second examples, the desiccant encloses an interior of the flexible compartment. In a fourth example of the system, optionally including one or more or each of the first through third examples, the mount protrudes radially from a ring-shaped portion of the lens assembly housing, and an expansion direction by which the flexible compartment expands is perpendicular to the lenses. In a fifth example of the system, optionally including one or more or each of the first through fourth examples, the cover and a gasket are flush with the ring-shaped portion. In a sixth example of the system, optionally including one or more or each of the first through fifth examples, the flexible compartment is constructed of a flexible material.

The disclosure also provides support for an expansion device, comprising: a flexible compartment with an adjustable volume, a gasket surrounding a perimeter of the flexible compartment and shaped according to a mount of a lens assembly, a desiccant that encloses the flexible compartment, and a cover comprising an opening through which the flexible compartment expands and contracts, wherein the gasket is interposed between the desiccant and the cover. In a first example of the system, the desiccant is configured to allow water to transfer to but not from the flexible compartment. In a second example of the system, optionally including the first example, a perimeter of the cover is approximately the same in size and shape to a perimeter of the gasket. In a third example of the system, optionally including one or both of the first and second examples, the cover protrudes into a space between the gasket and the flexible compartment. In a fourth example of the system, optionally including one or more or each of the first through third examples, fasteners fasten the cover to the mount. In a fifth example of the system, optionally including one or more or each of the first through fourth examples, the expansion device and the lens assembly are included in a multi-lens device.

In another representation, the disclosure also provides support for a multi-lens device, comprising: a flexible compartment fluidly coupled to a gap between a first lens and a second lens of a lens assembly. In a first example of the system, the system further comprises: a desiccant arranged between the flexible compartment and the gap. In a second example of the system, optionally including the first example, the flexible compartment is housed in a mount of the lens assembly, the flexible compartment retained within the mount via a cover. In a third example of the system, optionally including one or both of the first and second examples, the gap is filled with an inert gas. In a fourth example of the system, optionally including one or more or each of the first through third examples, at least one opening is arranged in the lens assembly and fluidly couples the gap to the flexible compartment.

In another representation, the disclosure also provides support for an optical device, comprising a lens assembly comprising a first lens and a second lens separate by a gap, and an expansion device arranged in a mount of the lens assembly, wherein the expansion device is retained within the mount via a cover. In a first example of the system, the cover comprises an opening through which the expansion device actuates. In a second example of the system, optionally including the first example, the system further comprises: a desiccant arranged in the mount. In a third example of the system, optionally including one or both of the first and second examples, the expansion device is fluidly coupled to the gap via at least one opening and a passage.

As used in this application, an element or step recited in the singular and preceded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A multi-lens device, comprising: a volumetrically flexible compartment fluidly coupled to a gap between a first lens and a second lens of a lens assembly, and a desiccant arranged between the flexible compartment and the gap, wherein the gap and the flexible compartment are hermetically sealed from outside of the lens assembly.

2. The multi-lens device of claim 1, wherein the flexible compartment is housed in a mount of the lens assembly, the flexible compartment retained within the mount via a cover.

3. The multi-lens device of claim 2, wherein the flexible compartment is integral with a gasket interposed between the cover and the mount.

4. The multi-lens device of claim 2, wherein a gasket and the cover include curvature that matches curvature of at least one of the first lens and the second lens.

5. The multi-lens device of claim 1, wherein the gap is filled with an inert gas.

6. The multi-lens device of claim 1, wherein the flexible compartment is a bellows with a plurality of folds.

7. An optical device, comprising a light source; a lens assembly including two or more lenses that receive light emitted by the light source, a gap between two of the lenses, and a lens assembly housing circumferentially surrounding the lenses and the gap; an expansion device including a flexible compartment arranged in a mount of the lens assembly housing and fluidly coupled to the gap; and a desiccant arranged in the mount, between the gap and the flexible compartment, wherein the flexible compartment is retained within the mount via a cover, and wherein the gap and the flexible compartment are hermetically sealed from outside of the lens assembly.

8. The optical device of claim 7, wherein the cover comprises an opening through which the flexible compartment actuates.

9. The optical device of claim 7, wherein the desiccant encloses an interior of the flexible compartment.

10. The optical device of claim 7, wherein the mount protrudes radially from a ring-shaped portion of the lens assembly housing, and an expansion direction by which the flexible compartment expands is perpendicular to the lenses.

11. The optical device of claim 10, wherein the cover and a gasket are flush with the ring-shaped portion.

12. The optical device of claim 7, wherein the flexible compartment is constructed of a flexible material.

13. An expansion device, comprising:
a flexible compartment with an adjustable volume;
a gasket surrounding a perimeter of the flexible compartment and shaped according to a mount of a lens assembly;
a desiccant that encloses the flexible compartment; and
a cover comprising an opening through which the flexible compartment expands and contracts, wherein the gasket is interposed between the desiccant and the cover and the flexible compartment is fluidly coupled to a gap between lenses of the lens assembly, wherein the gap and the flexible compartment are hermetically sealed from outside of the lens assembly.

14. The expansion device of claim 13, wherein the desiccant is configured to allow water to transfer to but not from the flexible compartment.

15. The expansion device of claim 13, wherein a perimeter of the cover is approximately the same in size and shape to a perimeter of the gasket.

16. The expansion device of claim 13, wherein the cover protrudes into a space between the gasket and the flexible compartment.

17. The expansion device of claim 13, wherein fasteners fasten the cover to the mount.

18. The expansion device of claim 13, wherein the expansion device and the lens assembly are included in a multi-lens device.

* * * * *